United States Patent
Anderle et al.

(10) Patent No.: US 9,527,227 B1
(45) Date of Patent: Dec. 27, 2016

(54) METHOD AND SYSTEM FOR MAKING AN ALPACA BONDED FIBER PAD

(71) Applicants: Mary Anderle, Highlands Ranch, CO (US); David A. Rauch, New Haven, IN (US)

(72) Inventors: Mary Anderle, Highlands Ranch, CO (US); David A. Rauch, New Haven, IN (US)

( * ) Notice: Subject to any disclaimer, the term of this patent is extended or adjusted under 35 U.S.C. 154(b) by 0 days.

(21) Appl. No.: 14/473,016

(22) Filed: Sep. 22, 2014

(51) Int. Cl.
*B29C 43/00* (2006.01)
*D04H 1/4266* (2012.01)
*D04H 1/54* (2012.01)
*B29C 43/52* (2006.01)
*B29K 67/00* (2006.01)

(52) U.S. Cl.
CPC ............ *B29C 43/003* (2013.01); *B29C 43/52* (2013.01); *D04H 1/4266* (2013.01); *D04H 1/54* (2013.01); *B29K 2067/00* (2013.01); *B29K 2089/00* (2013.01)

(58) Field of Classification Search
None
See application file for complete search history.

(56) References Cited

U.S. PATENT DOCUMENTS

| | | | | |
|---|---|---|---|---|
| 5,217,780 A * | 6/1993 | Wurzer | | 428/74 |
| 5,585,161 A * | 12/1996 | Difloe et al. | | 428/109 |
| 6,096,249 A * | 8/2000 | Yamaguchi | | 264/40.3 |
| 6,305,920 B1 * | 10/2001 | Kean et al. | | 425/83.1 |
| 2010/0093245 A1 * | 4/2010 | Bradley et al. | | 442/341 |
| 2010/0161520 A1 * | 6/2010 | Shavel et al. | | 705/500 |
| 2012/0181841 A1 * | 7/2012 | Petzel et al. | | 297/452.48 |

* cited by examiner

*Primary Examiner* — Mary F Theisen
(74) *Attorney, Agent, or Firm* — Edwin H. Crabtree; Ramon L. Pizarro

(57) ABSTRACT

A system for creating an alpaca bonded fiber pad. The pad is used for bedding products, cushions, toppers and furniture. The system includes an alpaca fiber washing station for cleaning and processing the fiber and a pad forming machine. The washing station is used to thoroughly wash, clean and dry the alpaca fiber. The washing station includes a series of wash tanks, squeeze pads and drying racks. The dried alpaca fiber is then baled and fed into the pad forming machine. The pad forming machine includes a plurality of individual sections with a series of conveyor belts. The conveyor belts are used for conveying the alpaca fiber and a polyester fiber from one station to the next and creating a finished alpaca bonded fiber pad.

15 Claims, 5 Drawing Sheets

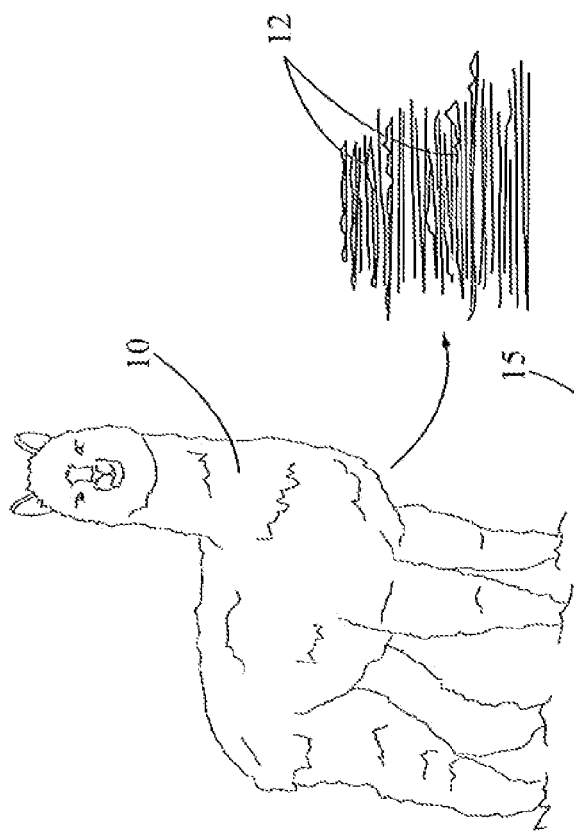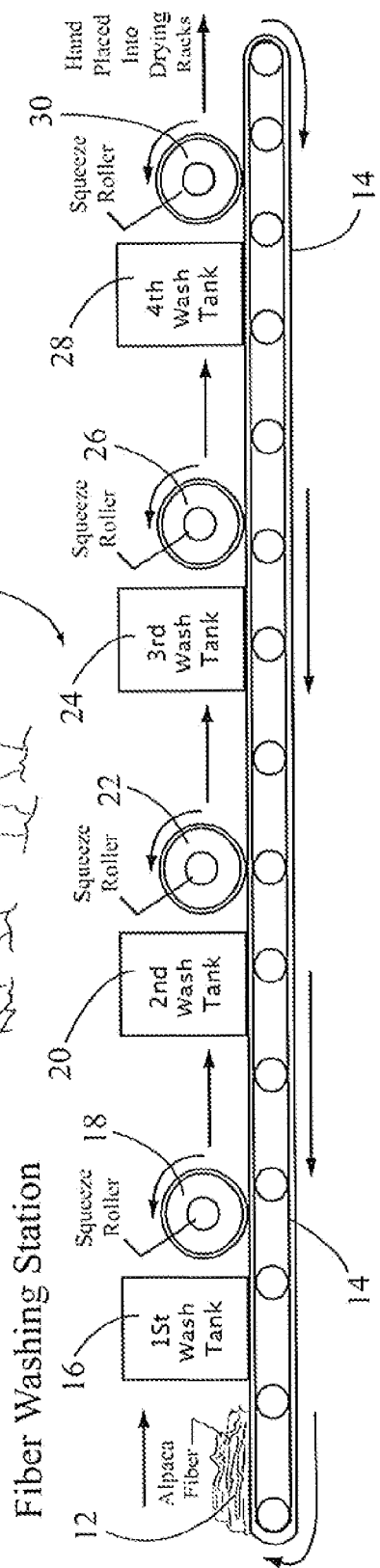
FIG. 1
FIG. 2

Compression and Cooling Section

Product Cutting Section

METHOD AND SYSTEM FOR MAKING AN ALPACA BONDED FIBER PAD

BACKGROUND OF THE INVENTION (a) Field of the Invention

This invention relates to the making of a natural fiber pad and more particularly to a method and system for making a bonded fiber pad using cleaned and processed alpaca fiber with the inherent advantages of the fiber.

(b) Discussion of Prior Art

Heretofore, there have been various methods and systems used for making pads, mattresses, cushions, toppers, furniture, and bedding products using cotton, wool, synthetic materials and like products. None of these prior art items provide the unique features and advantages of using an alpaca fiber as disclosed herein.

SUMMARY OF THE INVENTION

In view of the foregoing, it is a primary objective of the subject invention to provide a high quality alpaca pad cut to size and received inside a pad cover for consumer use.

Another object of the invention is alpaca fiber is naturally fire resistant, water resistant, and free of lanolin. Also the fiber has an insulation value for keeping a constant balance of temperature for keeping the pad cool in the summer and warm in the winter. The fiber is resistant to dust mites and is hypo-allergenic.

Still another object for using alpaca fiber as a pad is its anti-bacterial, anti-mildew, and biodegradable.

The subject invention includes a system having an alpaca fiber washing station for cleaning and processing the fiber and a pad forming machine. The washing station is used to thoroughly wash, clean and dry the alpaca fiber. The washing station includes a series of wash tanks, squeeze pads and drying racks. The dried alpaca fiber is then baled and fed into the pad forming machine.

The system also includes a pad forming machine having a plurality of individual sections with a series of conveyor belts. The conveyor belts are used for conveying the alpaca fiber and a polyester fiber from one station to the next and creating a finished alpaca bonded fiber pad.

The sections of the machine include an initial blending section for introducing and blending a low melt polyester fiber with the alpaca fiber and downstream creating a pad of blended, bonded fiber. A long fiber opener section is used for mechanically stretching or opening the fibers in the pad. Next, a stacking section is used for storing the fibers in a non-compressed state. A pad compression section is then used for adjusting the thickness and fullness of the fibers and creating a pad that's consistent in weight and size. An oven section of the machine is now used for heating and activating the low melt polyester fiber with the alpaca fiber and creating a continuous bonded fiber pad. A compression and cooling section is then used to chill the pad for locking the pad into a correct height and blowing cool air through the pad to eliminate any false loft. A final product cutting section now cuts the pad to a desired length and width for providing different sizes of pads.

The alpaca pad can now be quilted, used as a filling pad, or used in conjunction with other products such as box springs, cushions, bedding foam, toppers, mattresses and other sleeping surfaces.

These and other objects of the present invention will become apparent to those familiar with the making of different types of pad or rolls when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for a practical application of the making of the alpaca fiber pad, and in which:

FIG. 1 is a drawing of an alpaca and alpaca fiber sheared from the animal.

FIG. 2 illustrates the alpaca fiber washing station for cleaning, processing and drying the fiber.

DETAILED DESCRIPTION OF THE PREFERRED EMBODIMENTS

Figure 3:
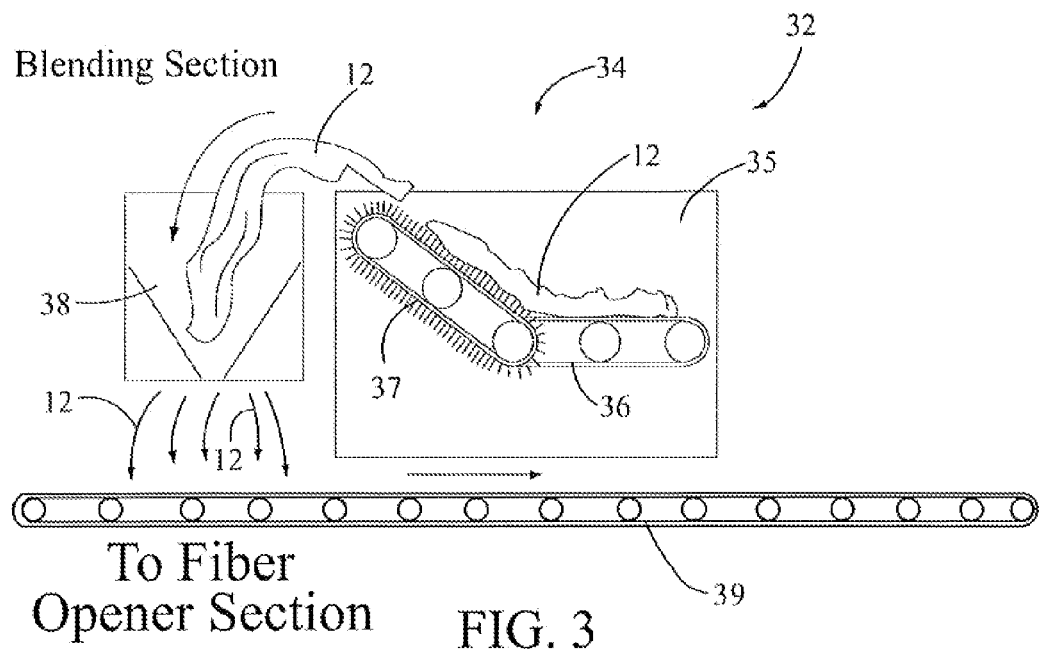
FIG. 3 illustrates a portion of a blending section of a pad forming machine. This portion of the blending section is used for conveying the alpaca fiber into a hopper for blending with a low melt polyester fiber.

In FIG. 1, an alpaca 10 is shown with a portion of alpaca fiber 12 sheared from the animal.

In FIG. 2, the alpaca fiber 12 is shown received on a washing station conveyor belt 14, which is part of a fiber washing station. The washing station is shown having general reference numeral 15. The station 15 includes a first wash tank 16 for washing the fiber 12 in 130 degree F. water with detergent. The fiber 12 is then rinsed and squeezed using a squeeze roller 18. To complete the washing of the fiber 12, a second wash tank 20 and second squeeze roller 22, a third wash tank 24 and third squeeze roller 26, and a fourth wash tank 28 and fourth squeeze roller 30 can be used to thoroughly clean the fiber 12 prior to being dried on drying racks. The drying racks are not shown in the drawings. Obviously, any number of wash tanks and squeeze rollers can be used to completely wash and clean the alpaca fiber 12.

In FIGS. 3-10, various sections of a pad making machine are illustrated. The machine is shown having a general reference numeral 32.

In FIG. 3, a blending section is shown having general reference numeral 34. The blending section 34 includes two or more blending housings 35 for tumbling and mixing the cleaned alpaca fiber 12 with a low melt polyester fiber. The blending housing 35 includes a wood slat conveyor belt 36 for tumbling and moving the cleaned fiber 12 upwardly onto an angled spiked apron conveyor 37. The fiber 12 is then dropped into a weighing pan and blending hopper 38 and discharged onto a blending section conveyor 39.

Figure 4:
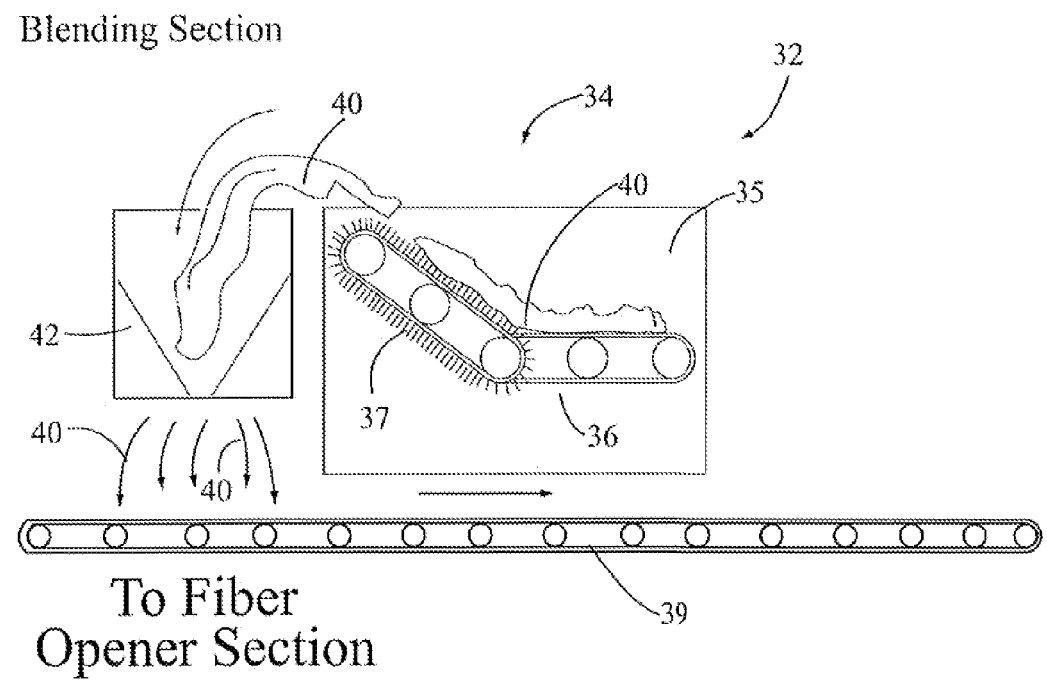
FIG. 4 shows another portion of the blending section used for conveying the low melt polyester fiber into a hopper and then onto a conveyor belt for blending with the alpaca fiber.

In FIG. 4, another blending housing 35 is shown with a wood slat conveyor belt 36 for moving a low melt polyester fiber 40 onto an angled spiked apron conveyor 37. The fiber 40 is then dropped into a weighing pan and blending hopper 38 for measuring the amount of polyester fiber 40 prior to being dropped onto the conveyor belt 39 and mixed with the alpaca fiber 12. Typically, the amount of polyester fiber 40 to alpaca fiber is 10 percent of the total volume, although the amount could range from 5 to 15 percent.

In practice, the blending section 34 can include five blending housings 35 for holding various percentages of alpaca fiber 12 and polyester fiber 40. For example, 20 ounces of alpaca fiber 12 can be held in a first three of the housings 40, 10 ounces of polyester fiber in a fourth housing 40 and 10 ounces of alpaca fiber 12 in a fifth housing. Obviously various combinations and amount of alpaca fiber and polyester fiber can be mixed together depending on the weight and density of the finished alpaca bonded fiber pad desired.

Figure 5:
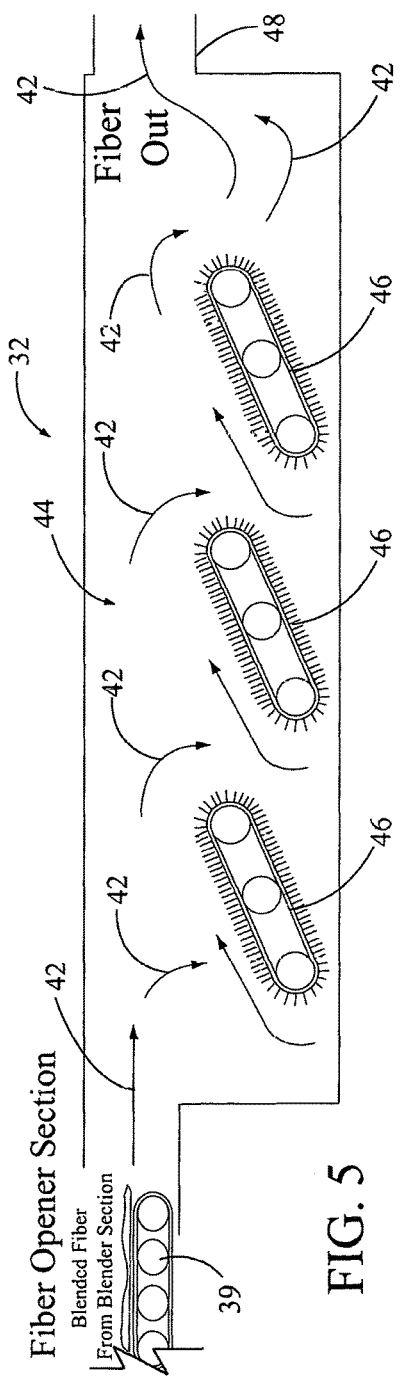
FIG. 5 illustrates the blended fibers introduced into a fiber opener section for stretching the alpaca fibers.

In FIG. 5, a blended mix of alpaca fiber 12 and polyester fiber 40, shown as arrows 42, is introduced into a fiber opener section for stretching the alpaca fibers. The opener section is shown having general reference numeral 44. The opener section 44 is used to mechanically stretch or open the fibers 42 using a series of spiked and gauged opener conveyor belts 46. The belts 46 are used to stretch and rip open the alpaca fiber 12 for dropping out any entrained dirt and debris left therein and not previously removed in the washing station 15. The fibers 42 are then blown through duct work 48 to a stacking section of the pad making machine 32.

Figure 6:
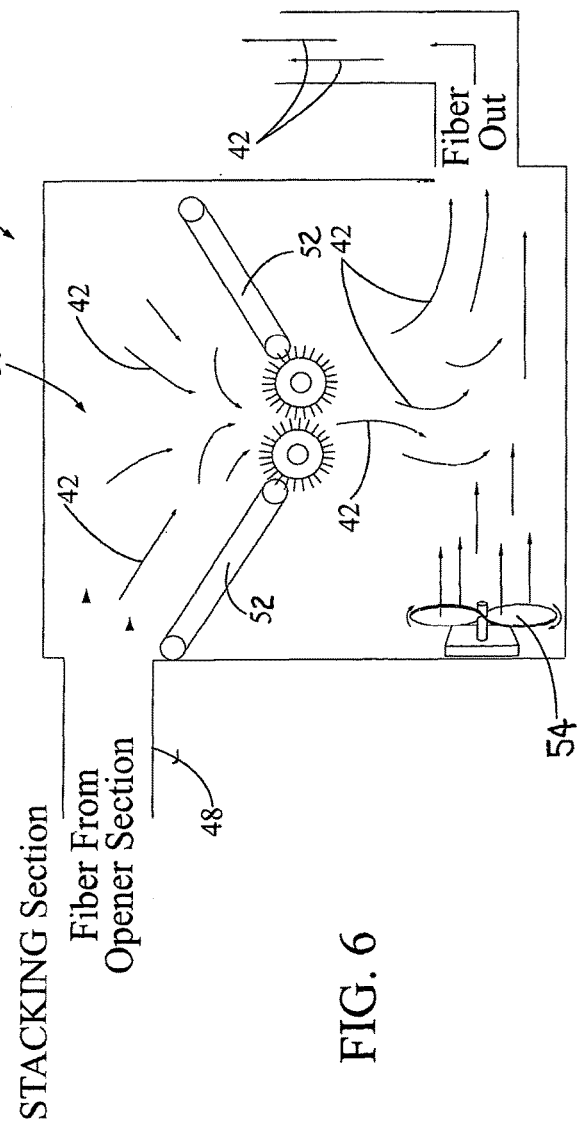
FIG. 6 shows the fiber pad introduced into a stacking section used for storing the fiber blend in a non-compression state and then blow out of the section using a fan.

In FIG. 6, the blown fibers 42 are introduced into a stacking section used for storing the mixture of fibers in a non-compression state. The stacking section is shown having general reference numeral 50. The stored fibers 42 are then, using a pair of downwardly slanted forming conveyor belts 52, pushed and packed against the belts. The fibers 42 are then blow out of the section 50 using a fan 54.

Figure 7:
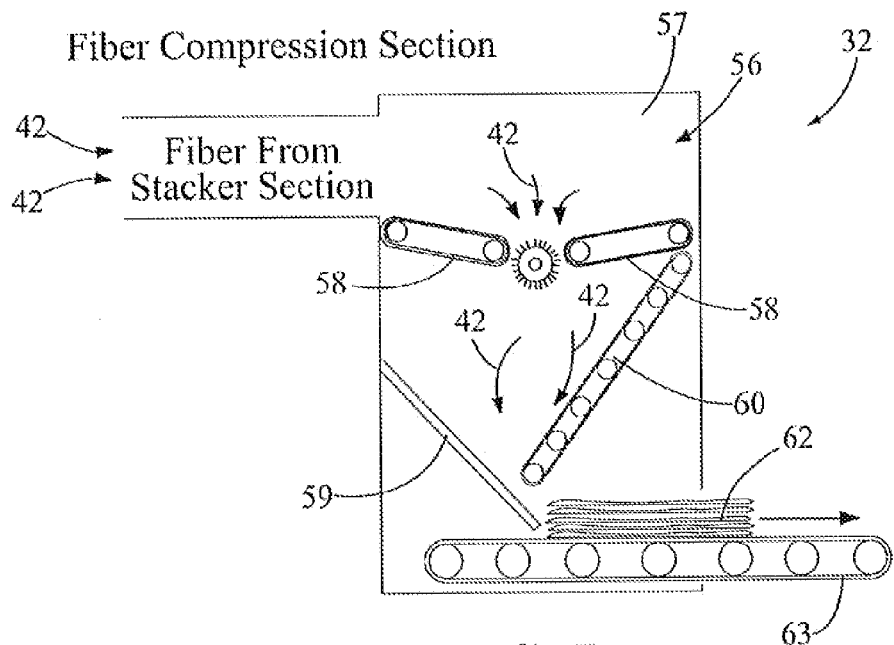
FIG. 7 illustrates the blown fiber received inside a pad compression section, which is used to adjust the thickness and fullness of a newly created fiber pad.

In FIG. 7, the blown fibers 42 are shown received inside a fiber compression section, having a general reference numeral 56, and blown into a top of a holding box 57. The fiber mixture is then pinched through a pair of compression rollers 58 and dropped into a center section of the holding box 57. A fiber angled chute 59 now forces the fibers 42 against an angled drive belt 60. This action provides for mixing and compacting the fibers 42 thoroughly for proper weight and density, thus forming a fiber pad 62. The compacted pad 62 is now discharged onto a horizontal conveyor belt 63. The belt 63 includes multiple weigh cells that electronically signal for adjusting the weight and density of the pad 62 as it enters into to a three compartment, gas fired, oven.

Figure 8:
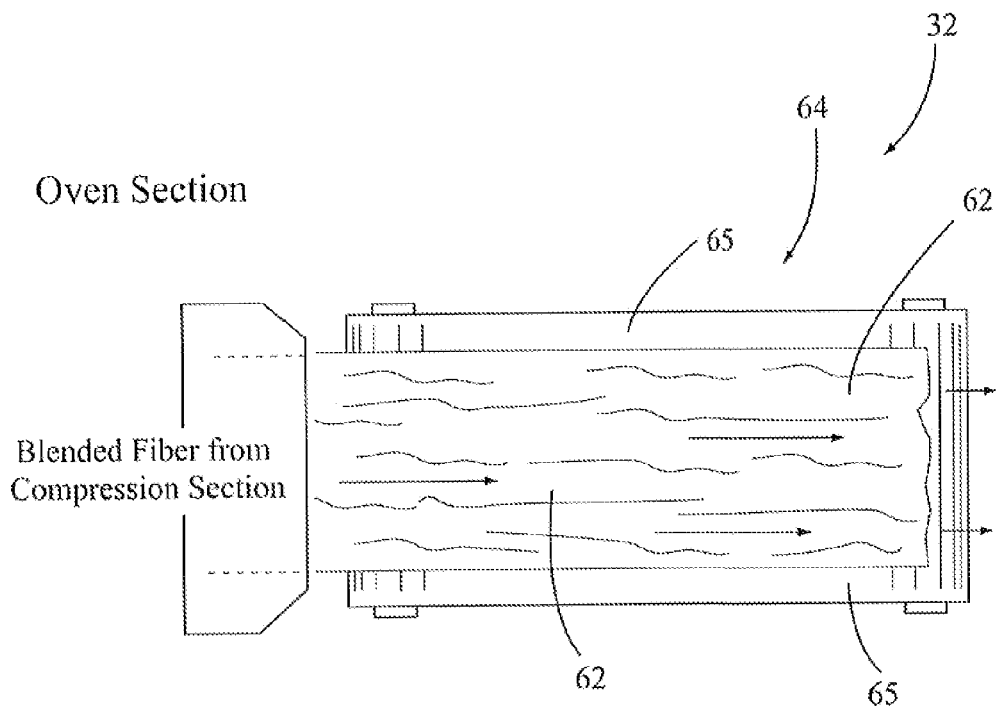
FIG. 8 is a top view of an oven section for heating and activating the low melt fiber, which is blended with the alpaca fiber.

In FIG. 8, a top view of an oven section is shown for heating and activating the low melt fiber 40 blended with the alpaca fiber 12. The oven section is shown having general reference numeral 64. The oven section 64 includes a oven conveyor belt 65 for moving the fiber pad 62 along a length of the oven section. At this time, the low melt polyester fiber 40 is heat activated in a range of 300 to 350 degrees F. for creating a bond with the alpaca fiber 12 and forming a continuous bonded pad 62.

Figure 9:
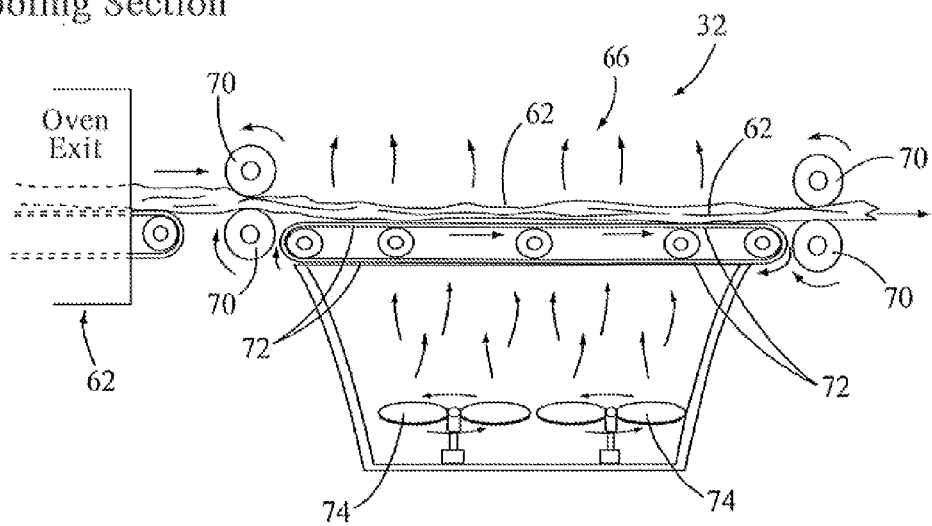
FIG. 9 illustrates a compression and cooling section used to chill alpaca pad from the oven section and lock in a correct height of the pad and for blowing cool air into the pad to eliminate false loft.

In FIG. 9, a compression and cooling section, having general reference numeral 66, is used with compression rollers 70 and a conveyor belt 72 to lock in a correct height of the bonded pad 62. Also, fans 74 are used to chill the bonded pad 62 by blowing cool air through the pad and eliminate false loft.

Figure 10:
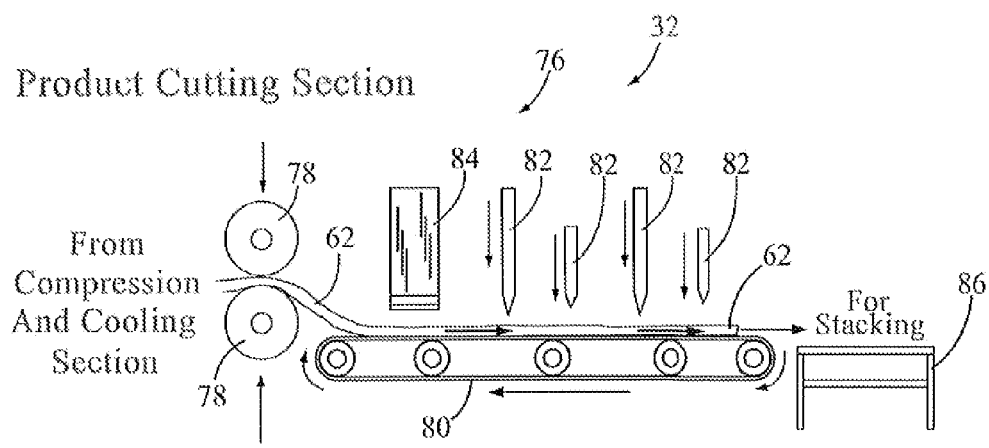
FIG. 10 shows a product cutting section for cutting the pad to a desired length and width.

In FIG. 10, a product cutting section, having general reference numeral 76, is shown for cutting the bonded pad 62 to a desired length and width. The cutting section 76 includes feed rollers 78 and a conveyor belt 80 for feeding the pad 62 past four cutting blades 82 for cutting a 80 inch wide pad into four 20 inch wide pads. Also, a cross cut guillotine knife 84 is shown for cutting the pad length wise. The cut pad 62 is then received on a stacking table 86 at the end of the conveyor belt 80.

Once the bonded alpaca pad 62 is cut to size, it can be quilted, used as a filling pad, or used in conjunction with other products, such as box springs, foam padding, and other sleeping surfaces.

While the invention has been particularly shown, described, and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A system for creating an alpaca bonded fiber pad from alpaca fiber, the pad used for bedding products, cushions, toppers and furniture, the system comprising:
    an alpaca fiber washing station for cleaning and drying the alpaca fiber;
    a pad forming machine including a plurality of sections, the machine including:
    a blending section for receiving the dried alpaca fiber and blending the alpaca fiber with a low melt polyester fiber;
    an opener section for stretching and opening the alpaca fiber and removing an remaining dirt and debris left therein after the dried alpaca fiber is received from the washing station and the blending section of the pad forming machine;
    a pad compression section for receiving a blend of the alpaca fiber and the polyester fiber and compressing the blend into a fiber pad, the pad compression station adjusting the fiber pad to a desired thickness and fullness;
    an oven section for heating and activating the polyester fiber for bonding with the alpaca fiber in the fiber pad;
    a compression and cooling section for cooling the fiber pad and adjusting the height of the fiber pad; and
    a product cutting section for cutting the fiber pad to a desired length and width.

2. The system as described in claim 1 wherein the washing station includes a series of wash tanks, squeeze pads and drying racks.

3. The system as described in claim 1 further including a stacking section used for storing the alpaca fibers and polyester fibers in a non-compression state and prior to introducing a mixture of the alpaca fibers and polyester fibers to the pad compression station.

4. The system as described in claim 1 wherein the oven section heats the low melt polyester fiber in a range of 300 to 350 degrees F. for creating a bond with the alpaca fiber.

5. The system as described in claim 1 where the low melt polyester fiber is blended in a range of 5 to 15 percent of the volume of alpaca fiber in the blending section.

6. A system for creating an alpaca bonded fiber pad from alpaca fiber, the pad used for bedding products, cushions, toppers and furniture, the system comprising:
   an alpaca fiber washing station for cleaning and drying the alpaca fiber;
   a pad forming machine including a plurality of sections, the machine comprising:
   a blending section for receiving the dried alpaca fiber and blending the alpaca fiber with a low melt polyester fiber;
   an opener section with spiked and gauged opener conveyor belts, the belts used for stretching and opening the alpaca fiber and removing any remaining dirt and debris left therein after the dried alpaca fiber is received from the washing station and the blending section of the pad forming machine;
   a pad compression section for receiving a blend of the alpaca fiber and the polyester fiber and compressing the blend into a fiber pad, the compression section including a holding box with compression rollers, a fiber angled chute and an angled drive belt, the fiber angled chute forcing the fibers against the drive belt for mixing and compacting the fibers for proper weight and density, the pad compression section also adjusting the fiber pad to a desired thickness and fullness;
   an oven section for heating and activating the polyester fiber for bonding with the alpaca fiber in the fiber pad;
   a compression and cooling section for cooling the fiber pad and adjusting the height of the fiber pad; and
   a product cutting section for cutting the fiber pad to a desired length and width.

7. The system as described in claim 6 wherein the washing station includes a series of hot water wash tanks, squeeze pads and drying racks for thoroughly washing and drying the alpaca fiber.

8. The system as described in claim 6 further including a stacking section used for storing the alpaca fibers and polyester fibers in non-compression state and prior to introducing a mixture of the fibers to the fiber compression station.

9. The system as described in claim 6 wherein the oven section heats the low melt polyester fiber in a range of 300 to 350 degrees F. for creating a bond with the alpaca fiber.

10. The system as described in claim 6 where the low melt polyester fiber is blended in a range of 5 to 15 percent of the volume of alpaca fiber in the blending section.

11. A method for creating an alpaca bonded fiber pad from alpaca fiber, the pad used for bedding products, cushions, toppers and furniture, the steps including:
   washing the alpaca fiber in a washing station for cleaning and drying the alpaca fiber;
   introducing the alpaca fiber in a pad forming machine, the pad forming machine including a plurality of sections as follows;
   receiving the dried alpaca fiber in a blending section and blending the alpaca fiber with a low melt polyester fiber;
   stretching and opening, in an opener section, the alpaca fiber and removing any remaining dirt and debris left therein after the dried alpaca fiber is received from the washing station and the blending section of the pad forming machine;
   compressing a blend of the alpaca fiber and the polyester fiber into a fiber pad in a a pad compression section, the pad compression section adjusting the fiber pad to a desired thickness and fullness;
   heating and activating the polyester fiber for bonding with the alpaca fiber in the fiber pad in an oven section;
   compressing and cooling the fiber pad and adjusting the height of the fiber pad in a compression and cooling section; and
   cutting the fiber pad to a desired length and width in a product cutting section.

12. The method as described in claim 11 wherein the step of washing the alpaca fiber includes washing the fiber in a series of hot wash tanks and using squeeze pads and drying racks.

13. The method as described in claim 11 further including storing the alpaca fibers and polyester fibers in a non-compression state in a stacking section and prior to introducing a mixture of the alpaca fibers and polyester fibers to the fiber compression station.

14. The method as described in claim 11 wherein the oven section is used for heating the low melt polyester fiber in a range of 300 to 350 degrees F. for creating a bond with the alpaca fiber.

15. The method as described in claim 11 where in the blending station is used for blending the low melt polyester fiber in a range of 5 to 15 percent of the volume of alpaca fiber.

* * * * *